UNITED STATES PATENT OFFICE.

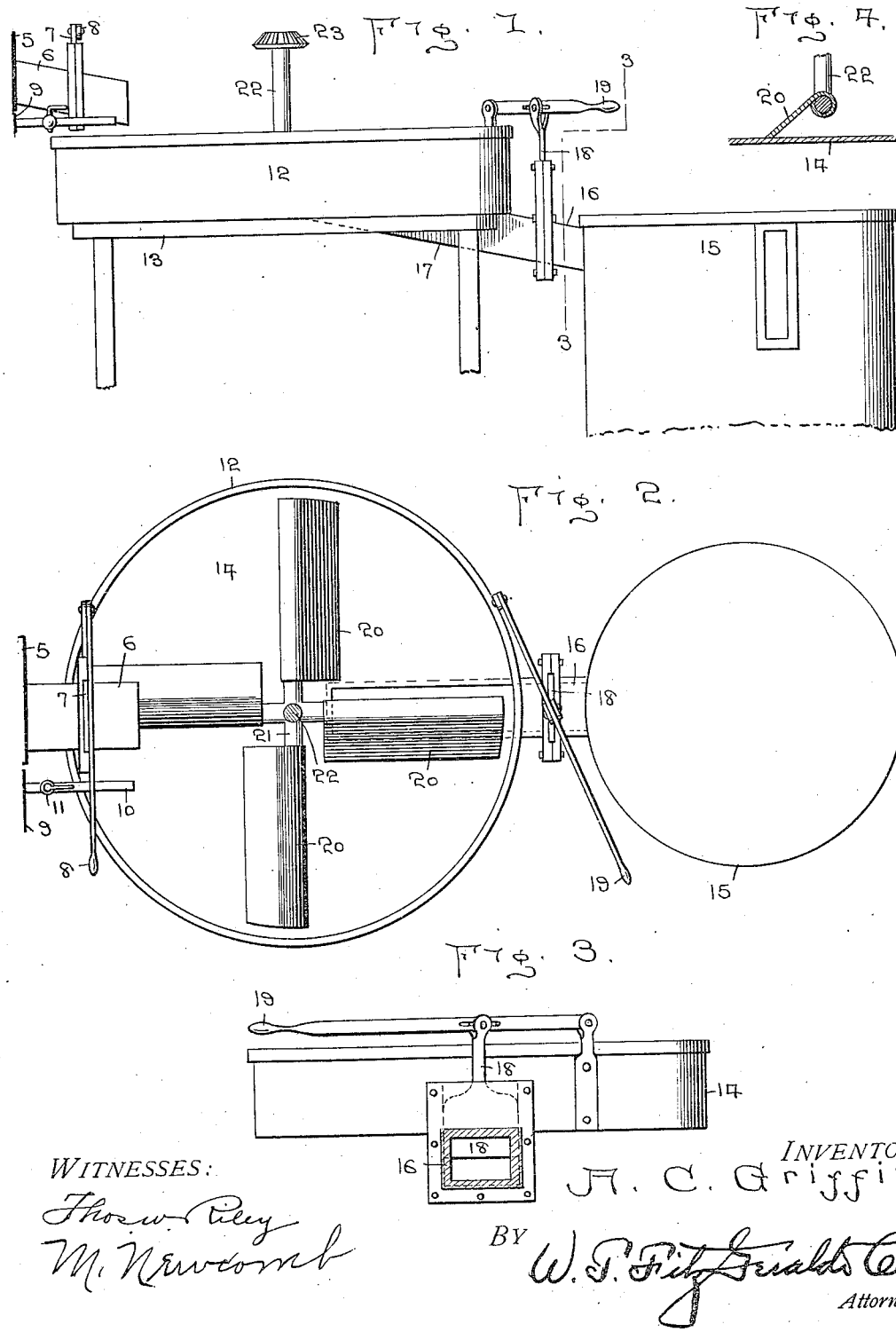

ANDREW C. GRIFFIN, OF BRATTLEBORO, VERMONT.

MIXING-MACHINE.

1,051,101. Specification of Letters Patent. Patented Jan. 21, 1913.

Application filed April 19, 1912. Serial No. 691,872.

*To all whom it may concern:*

Be it known that I, ANDREW C. GRIFFIN, a citizen of the United States, residing at Brattleboro, in the county of Windham and State of Vermont, have invented certain new and useful Improvements in Mixing-Machines; and I do hereby declare the following to be a full, clear, and exact description of the invention, such as will enable others skilled in the art to which it appertains to make and use the same.

This invention relates to mixing machines, and it more particularly relates to a machine of this character for mixing vegetables, preparatory to cooking and canning the same.

An object of the invention is to provide an improved machine of this character, interposed between a container wherein the prepared vegetable or vegetables are stored, and a vessel in which said vegetable or vegetables are cooked, and in such relation to a syrup supplying means, as to receive the syrup therefrom, and to thoroughly incorporate the syrup with the vegetable or vegetables, prior to delivering them into the cooking vessel.

A still further object of the invention is to provide a device of this character consisting of a shallow pan and a series of inclined paddles or lifters adapted to rotate horizontally within the pan and to continually lift and mix the contents thereof, while feeding the same into a depressed portion or receiver in the bottom of said pan.

Other objects and advantages may be recited hereinafter and in the claims.

In the accompanying drawings which form a part of this application, Figure 1 is a fragmental side elevation view showing the relation of my improved mixer to the inlet spout of the container and to the cooking vessel. Fig. 2 is a plan view of the mechanism shown in Fig. 1. Fig. 3 is a view of the mixing pan and certain of its adjuncts, as viewed at right angles to Fig. 1, and, Fig. 4 is a fragmental sectional detail view through one of the mixing blades or paddles.

Referring to the drawings in which similar reference characters designate corresponding parts throughout the several views, a container for vegetables is represented by the numeral 5, said container having a spout 6, a gate 7 being provided for opening and closing the spout, by means of a handle 8. A syrup tank 9 is provided with a spout 10 having a faucet 11. Said spouts 6 and 10 extend over the mixing pan 12, supported upon a table 13, to such elevation that its bottom 14 is on a higher plane than the cooking vessel 15, to which it is adapted to deliver the vegetable mixture, through the medium of a spout 16. This spout 16 merges with and constitutes a part of a receiver 17 for the vegetable mixture. The spout 16 is provided with a gate 18 operatively connected with a handle 19, by which the spout 16 may be opened and closed.

A series of paddles, blades or lifters 20 are supported by radial arms 21 and adapted to be rotated within the pan, by any proper means, through the medium of a vertical shaft 22 and a gear member 23.

The container, syrup tank and cooking vessel, being no part of my invention, will not be described in detail.

In operation, corn or other vegetables having first been prepared and placed within the container 5, and syrup within the tank 9, the gate 7 and faucet 11 may be adjusted for allowing the desired volume or quantity of vegetables and syrup to enter the pan 12, while the shaft 22 and blades 20 are rotating. These blades slide upon the bottom 14 of the pan and scoop the vegetables and syrup up from said bottom, so that it flows over the upper portions of the blades, and therefore becomes thoroughly incorporated by being successively raised and caused to flow over the lifter blades.

It is well known in the art, that corn or other vegetables have somewhat greater specific gravity than the juices thereof and than the syrups that are usually incorporated therewith; therefore, as the lifter blades 20 revolve in the pan, the corn or other solid vegetable matter gravitates into the receiver 17, thereby displacing an equal volume of the syrup, which rises into the pan to be incorporated with the solid matter that enters from the spout 6. The vegetable matter thus consolidated within the receiver 16—17, banks against the gate 18 and auxiliates the action of the gate in preventing the escape of an undesirable quantity of the syrup and juices into the cooker; as it will be understood, that, because of the nature of corn and other vegetable matter, the gate 18 may at times be held ajar by the tough-fibrous portions of the vegetable matter. It will also be seen that because of this considerable quantity of consolidated vegetable matter, the relative quantity of solid vegetable matter in the finished product, is increased, thereby providing a more valuable product.

It will be seen that I have provided a mixing machine of this character which is fully capable of attaining the foregoing objects, and in a thoroughly practical and efficient manner.

I do not limit my invention to the exact details of construction, combination and arrangement of parts as herewith described and illustrated, but my invention may only be limited by a reasonable interpretation of the following claims.

What I claim is:

1. In a mixing machine of the character described, a relatively shallow pan adapted to receive vegetable matter to be mixed therein and having a spout adapted to discharge the mixed vegetable material into a vessel, and a series of upwardly inclined lifter blades adapted to be resolved horizontally in the pan, for lifting and mixing the vegetable matter.

2. In a vegetable mixer, a pan having an outlet spout thereon and having a receiver merging with the outlet spout and with the bottom of the pan, a gate associated with the spout for opening and closing the same, and means in the pan for coacting with the spout in consolidating vegetable matter therein, whereby the action of the gate is auxiliated for more thoroughly sealing the outlet.

In testimony whereof I have signed my name to this specification in the presence of two subscribing witnesses.

ANDREW C. GRIFFIN.

Witnesses:
CARL S. HOPKINS,
HELEN L. HOPKINS.

Copies of this patent may be obtained for five cents each, by addressing the "Commissioner of Patents, Washington, D. C."